Nov. 13, 1962    F. W. TRIPLETT    3,063,523
BOOM
Filed Aug. 31, 1959    2 Sheets-Sheet 1
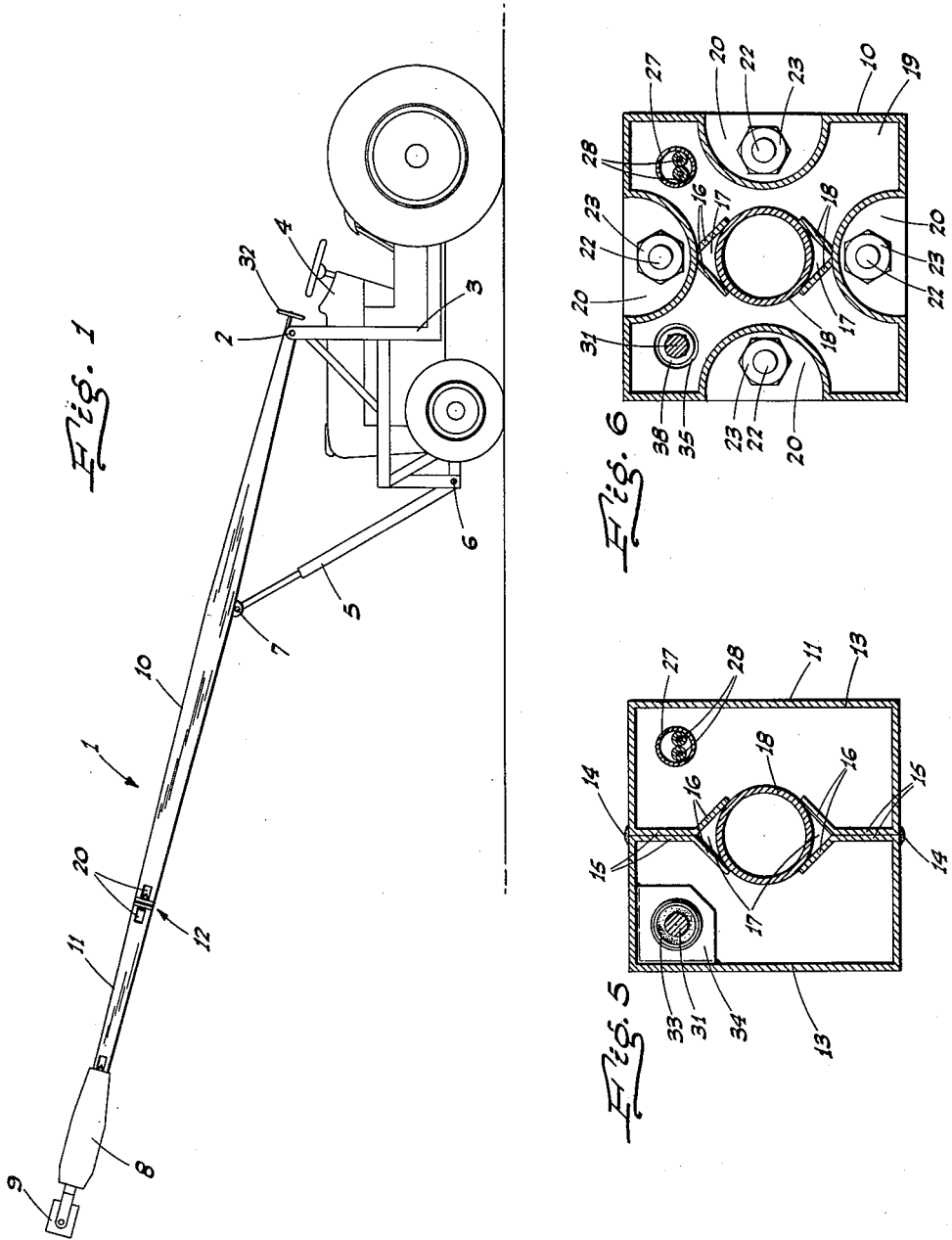
INVENTOR.
Frank W. Triplett
BY
Webster & Webster
ATTYS.

Nov. 13, 1962   F. W. TRIPLETT   3,063,523
BOOM
Filed Aug. 31, 1959   2 Sheets-Sheet 2
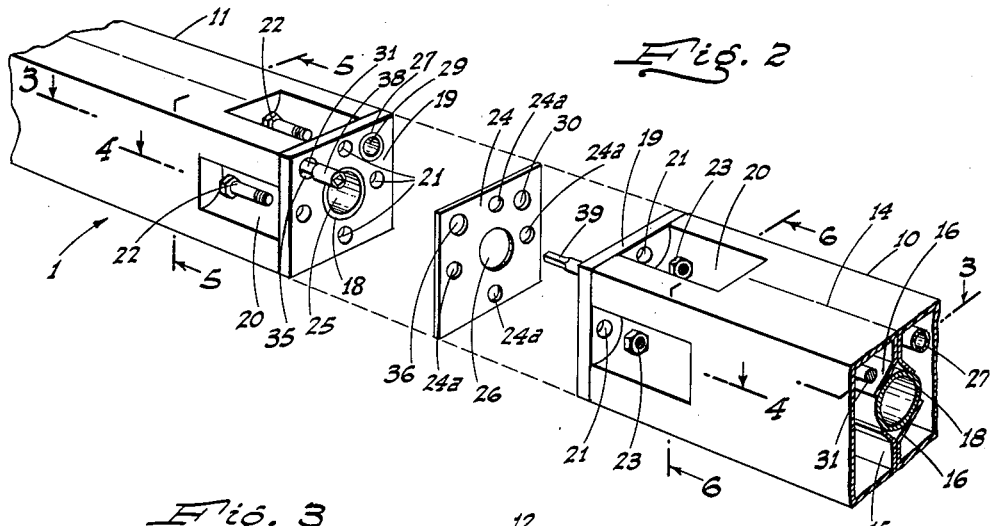
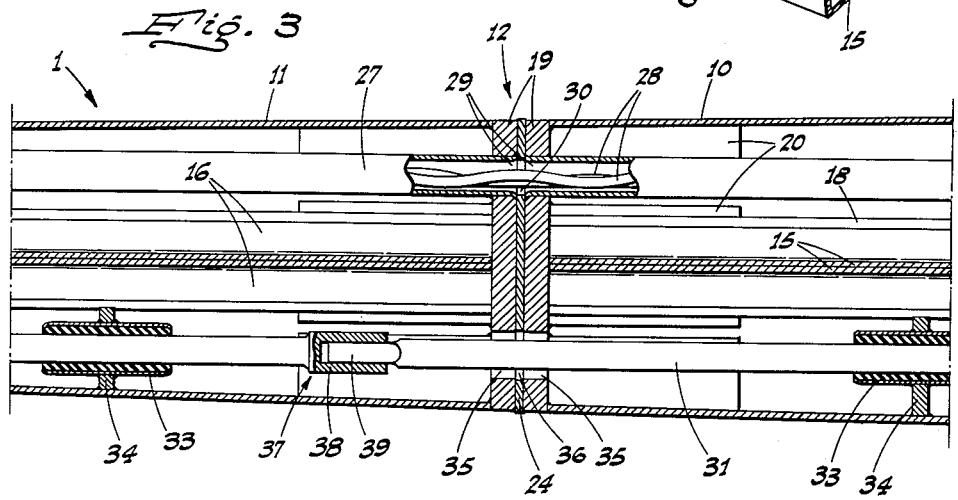
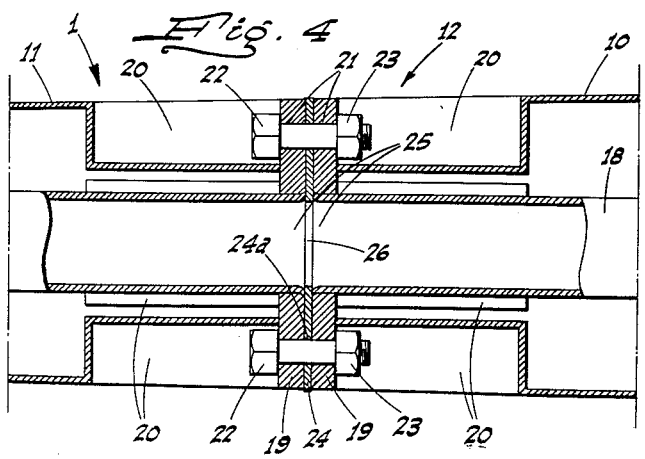
INVENTOR.
Frank W. Triplett
BY
Webster & Webster
ATTYS.

United States Patent Office 3,063,523
Patented Nov. 13, 1962

3,063,523
BOOM
Frank W. Triplett, Stockton, Calif., assignor to A. D. Goodwin & Son, Inc., a corporation of California
Filed Aug. 31, 1959, Ser. No. 837,074
6 Claims. (Cl. 189—37)

The present invention is directed to, and it is a major object to provide, a novel boom for use on light-duty industrial or agricultural equipment; the boom being especially designed—but not limited—for use as a component part of a boom type, tractor mounted, tree shaking mechanism, and which is employed to shake nuts or fruit from a tree during harvest.

Another important object of this invention is to provide a boom which is constructed so that substantial strength and rigidity is attained, yet without excessive weight and even though the boom is of considerable length.

Still another object of the invention is to provide a boom which is sectional; the longitudinal sections being detachably secured together—at adjacent ends or at a joint—in a novel manner.

An additional object of the invention is to provide a boom which incorporates therein a longitudinal pipe for the transmission of air under pressure through the boom for the purpose of actuating a pneumatic device attached to the outer end of said boom; such pipe being in sections which correspond to—and extend the length of—the boom sections, and said pipe sections being maintained in communication in the assembled boom by means of a novel gasketed joint.

It is also an object of the invention to provide a boom, as in the preceding paragraph, which additionally includes an electric wire enclosing conduit and a rotatable control shaft, both of which extend in the boom from end to end thereof; the conduit and shaft—just as the air pressure transmission pipe—being sectional and mating in the assembled boom.

Still another object of the invention is to provide a practical, reliable, and durable boom, and one which will be exceedingly effective for the purpose for which it is designed.

These objects are accomplished by means of such structure and relative arrangement of parts as will fully appear by a perusal of the following specification and claims.

In the drawings:

FIG. 1 is a somewhat diagrammatic side elevation of the boom as included in a tractor mounted tree shaking mechanism.

FIG. 2 is a fragmentary perspecting view, exploded, of a representative longitudinal portion of the boom; the view showing adjacent portions of the boom sections, and the parts which comprise the joint therebetween.

FIG. 3 is a fragmentary longitudinal sectional plan corresponding to FIG. 1, but showing the adjacent portions of the boom as assembled; the view being taken on line 3—3 of FIG. 2.

FIG. 4 is a similar view, but is taken on line 4—4 of FIG. 2.

FIG. 5 is a transverse section taken on line 5—5 of FIG. 2.

FIG. 6 is a transverse section taken on line 6—6 of FIG. 2.

Referring now more particularly to the drawings and to the characters of reference marked thereon, the boom, which is of elongated sectional form, is indicated generally at 1; such boom being here shown (see FIG. 1) as embodied in a tractor mounted tree shaking mechanism. At its inner end the boom 1 is transversely pivoted, as at 2, on an upstanding part of a frame 3 secured to a tractor 4; there being a forwardly and upwardly inclined, elongated power cylinder 5 pivotally connected at its lower end to a forward part of the frame 3, as at 6, and pivotally connected at its upper end to the boom 1, as at 7. The power cylinder 5 serves the purpose of raising and lowering the boom 1.

At its outer end the boom 1 is fitted with a shaker unit, indicated generally at 8, which shaker unit forms no part of the present invention, but is solenoid valve controlled and pneumatically actuated. The shaker unit 8 is provided at its outer end with a reciprocable tree engaging head 9 which in practice is preferably in the form of a yoke.

The present invention is directed to the construction of the boom 1, and which—in the present embodiment—includes an inner box beam section 10 and an outer box beam section 11 abutting at adjacent ends and detachably connected by a joint, indicated generally at 12.

Each of the boom sections 10 and 11 is comprised of a pair of elongated, initially separate, channel members 13 opening toward each other and disposed in matching engagement; said members being welded together top and bottom by longitudinal, central lines of weld, as at 14.

At their adjacent or abutting edges the channel members 13 include—in integral relation—inturned right angle flanges 15 which rest in abutment, and which flanges extend inwardly a limited distance. At their inner edges the flanges 15—of each pair—are formed with integral, longitudinally extending, inwardly divergent wings 16 which form cradles 17. The cradles 17 open towards each other and are spaced apart.

A central pipe section 18 is disposed between and is rigidly supported by the opposed cradles 17; such pipe section extending the full length of the related boom section.

At adjacent ends the boom sections 10 and 11 are connected by the joint 12, and which comprises the following:

Each of the boom sections 10 and 11 is provided with an end plate 19 secured in place as by welding; there being wells 20 in the four sides of each boom section immediately adjacent and opening to the back side of such end plate 19. Each end plate 19 is formed with bolt holes 21 which open into the wells 20; the end plates 19—when the boom is assembled—being secured together in matching relation, by bolts 22 which extend from the wells 20 of one boom section, through the matching bolt holes 21, and thence into the wells of the other boom section, where such bolts are fitted with retention nuts 23.

A gasket 24 is engaged between the end plates 19 when the same are secured together, as above; the bolts 22 passing through holes 24a in said gasket. The purpose of such gasket will hereinafter appear.

The central pipe section 18 in each of the boom sections 10 and 11 opens through the related end plate 19, as at 25, and is suitably secured in connection therewith; the pipe section terminating flush with the outer face of the end plate. When the end plates 19 are secured together, the central pipe sections 18 in the boom sections 10 and 11 are in register and in communication with each other; the gasket 24 having a central circular opening 26 which matches the openings 25, and is of a diameter corresponding to the bore of the pipe section, as shown in FIG. 4.

It will thus be recognized that when the boom 1 is assembled, air under pressure can be transmitted without leakage through the boom, from its inner end to the pneumatically actuated shaker unit 8 on its outer end, by means of the communicating pipe sections 18.

As the shaker unit 8 is solenoid valve controlled it is necessary that electric wires run through the boom 1 from end to end thereof, and this is accomplished as follows:

Each of the boom sections 10 and 11 includes therein—and in offset relation to the wells 20—an electric wire enclosing conduit 27 wherein the wires are shown at 28. Each conduit 27 opens through the related end plate 19, as at 29, and is suitably secured in connection therewith; the conduits 27 being matching in communication when said end plates are secured together, and the gasket 24 is provided with a corresponding hole 30. Thus, after the boom 1 is assembled, the electric wires 28 can be run therethrough from end to end in the conduits 27.

The shaker unit 8 is rotatable, about a longitudinal axis, on the outer end of the boom 1, and which rotation is controlled by a longitudinal shaft 31 which extends full length through the boom 1 and out of the rear or lower end thereof, and where such shaft is fitted with a hand wheel 32. The shaft 31 is supported—at spaced points in the length of the boom 1, and in offset relation to the wells 20—by means of rubber-lined guide sleeves 33 supported by bracket plates 34.

At the joint 12 the longitudinal shaft 31 passes through matching holes 35 in the end plates 19, and a corresponding hole 36 in the gasket 24.

In order to permit the boom sections 10 and 11 to be detached one from the other at the joint 12, the longitudinal shaft 31 includes—at a point in its length and adjacent said joint—a separable connection 37 which comprises a socket 38 and a non-circular shank 39 slidably engaged in said socket.

The boom 1, constructed as described, provides a very effective support between the tractor 4 and the shaker unit 8, while permitting of the transmission of air pressure through the boom, and the running of the electric wires 28 and the longitudinal control shaft 31 therethrough, but without obstructing the disconnection or detachment of the boom sections 10 and 11 at the joint 12 when desired.

The described boom 1, in addition to the foregoing advantages, is strong and rigid, while not of undue weight. Additionally, by the provision of the wells 20 and the connection of the end plates 19 by the bolts 22 which extend therethrough from well to well, there are no lateral projections from the boom at the joint. This is advantageous for the reason that the boom frequently projects among the limbs of a tree, and which limbs might be caught and damaged or broken by any lateral projections on said boom.

From the foregoing description it will be readily seen that there has been produced such a device as will fully fulfill the objects of the invention, as set forth herein.

While this specification sets forth in detail the present and preferred construction of the device, still in practice such deviations therefrom may be resorted to as do not form a departure from the spirit of the invention, as defined by the appended claims.

Having thus described the invention, the following is claimed as new and useful, and upon which Letters Patent are desired:

1. In a boom, initially separate longitudinal boom sections disposed end to end, transverse end plates fixed on adjacent ends of the boom sections, and bolts securing the end plates together; each boom section having wells in the sides thereof adjacent and opening to the related end plate, and the bolts extending from the wells in one boom section, through the end plates, and into the wells of the other boom section.

2. In a box-beam boom section: means forming opposed, facing but spaced apart longitudinal cradles therein in rigid relation and spaced from the side walls of the boom section, a longitudinal pipe section in the boom section between and supported by said cradles, and an end plate fixed on one end of the boom section, the pipe section at the adjacent end opening through and being secured in said end plate.

3. In a box-beam boom section, as in claim 2, wherein rigid longitudinal flanges extend inwardly from opposite sides of said section centrally of the width thereof, and the cradles are formed on the inner edges of said flanges by means of longitudinal inwardly divergent wings.

4. A box-beam boom section comprising initially separate longitudinal channel members facing each other and secured together along adjacent matching edges, longitudinally extending right angle flanges projecting inwardly from said edges in face to face engagement whereby to provide pairs of said flanges in the boom section in spaced relation, longitudinal inwardly divergent wings on the inner edges of said flanges defining opposed, facing but spaced longitudinal cradles, a longitudinal pipe section in the bom section between and supported by said cradles, an end plate fixed on one end of the boom section, and the pipe section at the adjacent end opening through said end plate.

5. In a boom, initially separate longitudinal boom sections disposed end to end, transverse end plates fixed on adjacent ends of the boom sections, and bolts securing the end plates together; each boom section including a longitudinal pipe section mounted therein, the adjacent ends of the pipe sections opening through the end plates and terminating at the outer faces of said plates; said ends of the pipe sections being alined and in communication when the end plates are secured together, and a gasket confined between the plates when said plates are secured together, and engaging the ends of the pipe sections; the gasket having an opening alined with the bore of the pipe sections.

6. A boom, as in claim 5, in which the gasket conforms in shape to and is substantially the same size as the end plates, said gasket having holes through which the bolts extend and locating the gasket relative to the pipe sections.

References Cited in the file of this patent

UNITED STATES PATENTS

| | | |
|---|---|---|
| 454,717 | Decker | June 23, 1891 |
| 745,570 | Clarke | Dec. 1, 1903 |
| 1,120,880 | Zwiesler | Dec. 15, 1914 |
| 2,097,600 | Pavlecka | Nov. 2, 1937 |
| 2,308,565 | Mitchell | Jan. 19, 1943 |
| 2,610,754 | Inskeep | Sept. 16, 1952 |
| 2,685,775 | Gould | Aug. 10, 1954 |
| 2,804,743 | Gould | Sept. 3, 1957 |

FOREIGN PATENTS

| | | |
|---|---|---|
| 17,779 | Great Britain | Nov. 7, 1889 |